United States Patent

Shimizu et al.

[11] Patent Number: 5,930,453
[45] Date of Patent: Jul. 27, 1999

[54] IMAGE PROCESSING APPARATUS WITH TWO TYPES OF DATA FORMAT

[75] Inventors: Tetsuya Shimizu, Yokohama; Makoto Shimokoriyama, Kawasaki; Mitsugu Tanaka, Kawasaki; Katsumi Karasawa, Kawasaki; Yoshiki Ishii, Yokohama; Yasuyuki Tanaka, Tokyo; Hidenori Hoshi, Kawasaki, all of Japan

[73] Assignee: Canon Kabushiki Kaisha, Tokyo, Japan

[21] Appl. No.: 08/296,928

[22] Filed: Aug. 31, 1994

Related U.S. Application Data

[63] Continuation of application No. 07/968,309, Oct. 29, 1992, abandoned.

[30] Foreign Application Priority Data

Nov. 1, 1991 [JP] Japan ................................ 3-287852
Nov. 5, 1991 [JP] Japan ................................ 3-288514

[51] Int. Cl.⁶ .............................. H04N 5/91; H04N 5/225
[52] U.S. Cl. .................................... 386/131; 386/117
[58] Field of Search .................... 358/335, 342, 358/312, 313, 310; 360/32, 10.1, 11.1; 348/441, 474, 469, 571; 386/46, 131, 107, 117, 38, 1; H04N 5/91, 5/225

[56] References Cited

U.S. PATENT DOCUMENTS

| | | | |
|---|---|---|---|
| 4,751,587 | 6/1988 | Asahina | 358/335 |
| 4,796,100 | 1/1989 | Sakaguchi | 358/342 |
| 4,816,925 | 3/1989 | Hayashi | 358/342 |
| 4,860,109 | 8/1989 | Kawakami et al. | 358/400 |
| 4,897,799 | 1/1990 | Le Gall et al. | 364/514 |
| 4,931,879 | 6/1990 | Koga et al. | 358/335 |
| 4,953,019 | 8/1990 | Shikakura et al. | 358/133 |
| 4,979,187 | 12/1990 | Aoki et al. | 375/27 |
| 5,022,090 | 6/1991 | Masaki et al. | 382/49 |
| 5,067,010 | 11/1991 | Ishii et al. | 358/13 |
| 5,136,396 | 8/1992 | Kato et al. | 358/426 |
| 5,153,730 | 10/1992 | Nagasaki et al. | 358/209 |
| 5,282,049 | 1/1994 | Hatakenaka et al. | 358/335 |

OTHER PUBLICATIONS

Patent Abstracts of Japan, vol. 013001 (Kokai 63–211019) Sep. 1988.

Yamamitsu et al., "An Experimental Study for a Home–Use Digital VTR", in IEEE Trans. Consumer Electronics, 1989 No. 3 (Aug. 1989) pp. 450–456.

*Primary Examiner*—Robert Chevalier
*Attorney, Agent, or Firm*—Fitzpatrick, Cella, Harper & Scinto

[57] ABSTRACT

In transferring image data between a first memory for storing image data in a first sequence and inputting and outputting the image data from and to a first data bus and a second memory for storing image data in a second sequence different from the first sequence and inputting and outputting the image data from and to a second data bus, the permission and the inhibition of the writing of the transferred image data to a transfer destination are controlled and the error detection/correction encoding/decoding is effected during the transfer to facilitate the address management and permit high speed processing of the image data.

13 Claims, 7 Drawing Sheets

IMAGE PROCESSING APPARATUS WITH TWO TYPES OF DATA FORMAT

This application is a continuation of application Ser. No. 07/968,309 filed Oct. 29, 1992 now abandoned.

BACKGROUND OF THE INVENTION

1. Field of the Invention

The present invention relates to an image processing apparatus which handles digital data in a first format (for example, an image displaying format) and a second format (for example, a medium recording format).

2. Related Background Art

An apparatus for digitally transmitting (including recording and reproducing) image data has been developed in recent years so that image transmission free of S/N degradation and recording and reproducing free of aging have been attained. The format of an image signal to be handled in such a digital image processing apparatus may include a display format (or a standard input/output format) in which pixel signals (and video sync. signals) are arranged along a direction of scan such as a monitor output or a camera input, a record format of a magnetic recording medium and a transmission/reception format in accordance with a specific transmission rule of a transmission line. Conversion between those formats is carried out as required.

Figure 1A:
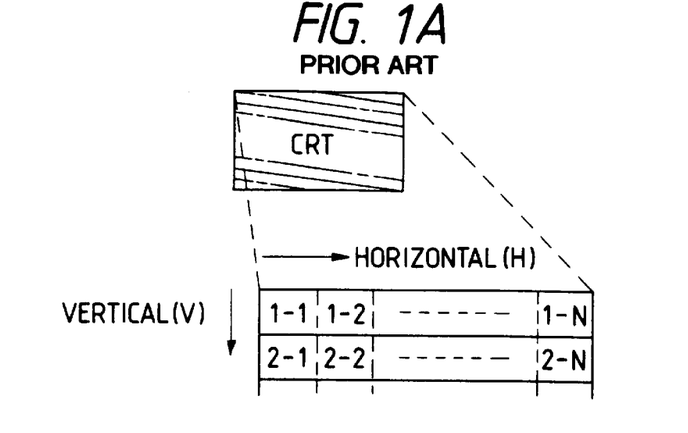
FIGS. 1A and 1B show a data format in the order of scan of image, and a record data format on a recording medium.
Figure 1B:
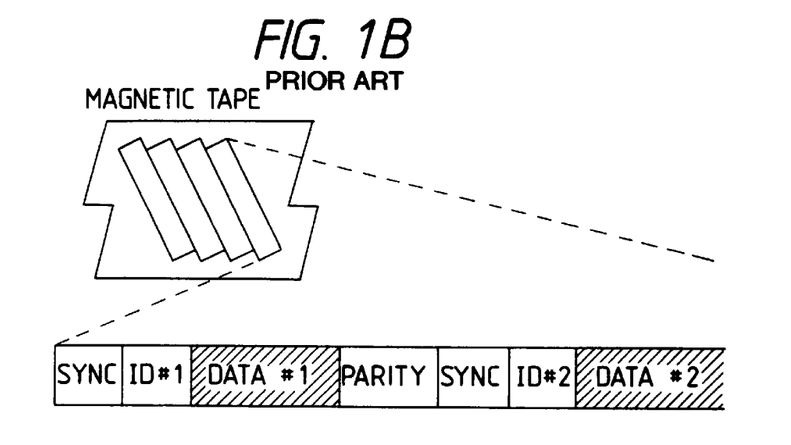

In transmitting or recording an image, data is shuffled, an error correction code is added, and in each data block, a sync. code SYNC and an identification code ID are added. FIG. 1A shows a basic format in which pixel data are arranged in the order of horizontal scan and vertical scan, and FIG. 1B shows a record format of a magnetic tape in a digital VTR. The basic format shown in FIG. 1A, corresponds to the horizontal vertical scan in a video monitor.

In the digital image processing apparatus, it is common that a data memory for temporarily storing image data to be processed is equipped. In a prior art digital image processing apparatus, in order to save hardware, circuit blocks such as input/output circuit, record/reproduce circuit and data memory are coupled through a bus so that one data memory is shared. One example of such a digital image processing apparatus is a digital video tape recorder (VTR).

Figure 2:
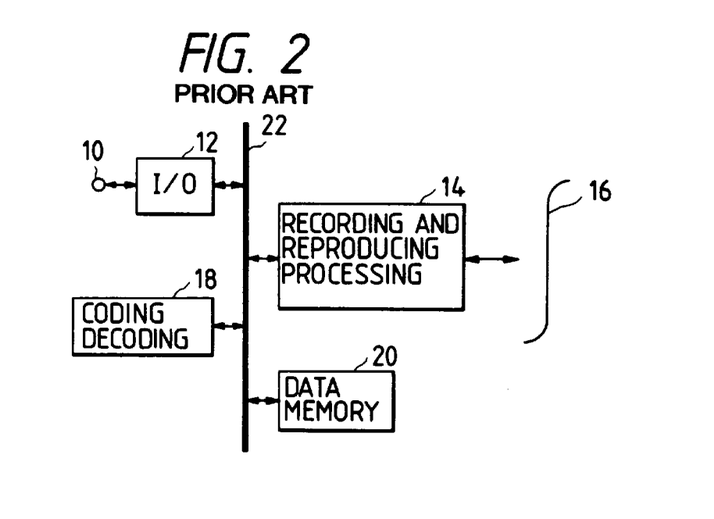
FIG. 2 shows a block diagram of a basic configuration of a prior art digital VTR, FIG. 3 schematically illustrates a manner of data flow through a data bus in the digital VTR of FIG. 2.

FIG. 2 shows a block diagram of a basic configuration of a prior art digital VTR. Numeral 10 denotes an input/output terminal to be connected to a transmission line such as a public telephone line network or a digital network, a TV camera, an image monitor or a transmission line interface unit, numeral 12 denotes an input/output circuit comprising an A/D converter, D/A converter and a predetermined interface circuit, and numeral 14 denotes a recording and reproducing circuit for digitally recording image data on a magnetic tape 16 and reproducing the signal recorded on the magnetic tape 16.

Numeral 18 denotes an encoder/decoder for encoding and decoding error correction codes of an outer code and an inner code due to the recording and reproducing, numeral 20 denotes a data memory to be used for recording and reproducing by the recording and reproducing circuit 14, for encoding and decoding the error correction code by the encoder/decoder 18 and for the input/output by the input/output circuit 12, and numeral 22 denotes a data bus for interconnecting the circuits 12, 14, 18 and 20.

Figure 3:
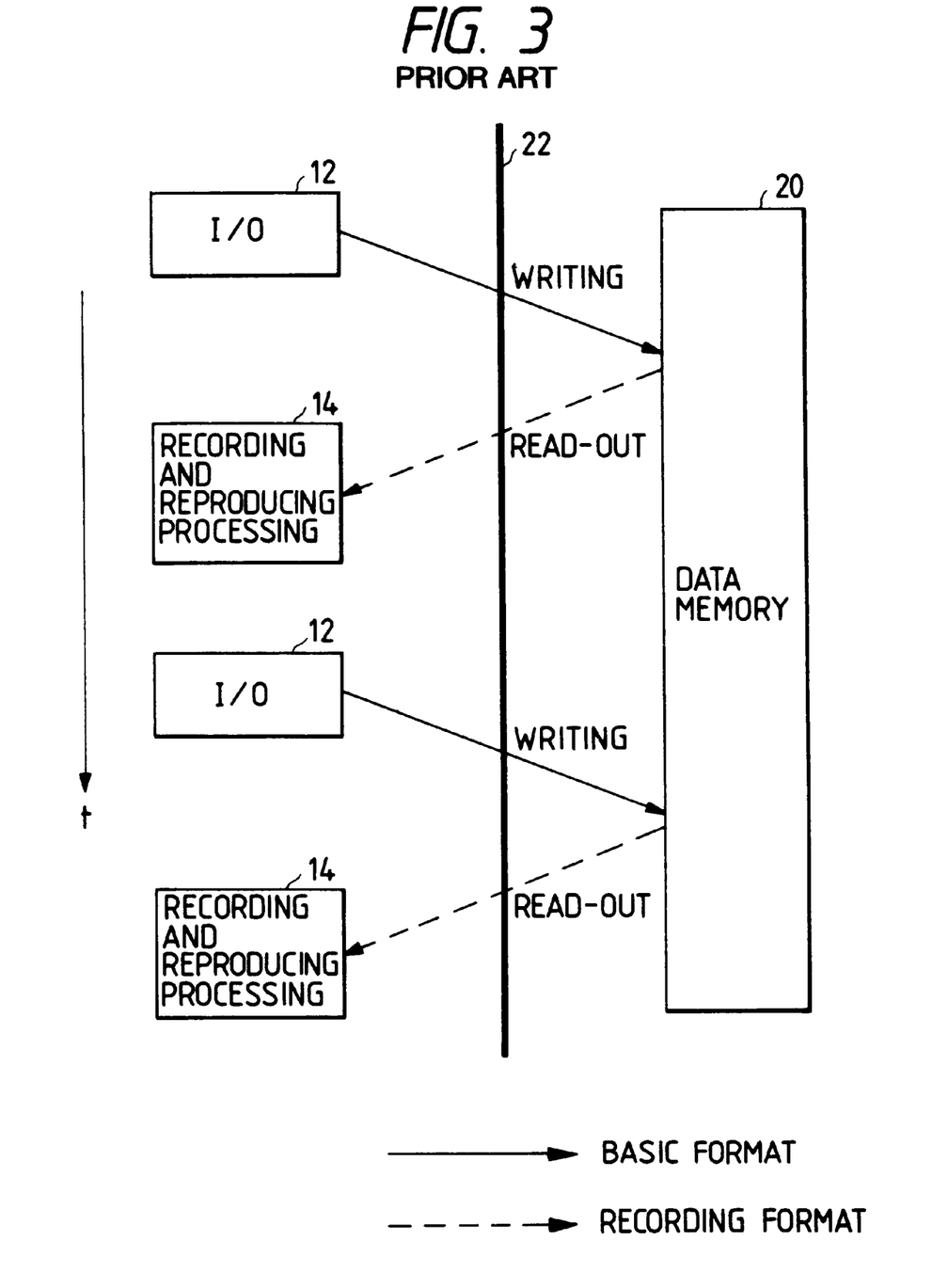

A data flow through the data bus 22 is shown in FIG. 3. The writing of the data from the input/output circuit 12 to the data memory 20 is conducted in the basic format. The encoder/decoder 18 accesses the data memory 20 in the basic format (or its own format) to encode the error correction code. The recording and reproducing circuit 14 reads the data of the data memory 20 in the record format and records it on the magnetic tape 16 in sync. blocks.

In the prior art, the input/output to one data bus so frequently occurs that an access rate of the data bus and the data memory is high. Particularly when a video signal is to be processed on real time basis, a faster processing speed is required.

Where the same data memory is read and written in different formats such as the basic format and the record format, the management and control of the memory addresses are complex. In order to facilitate it, a memory address generator which is compatible to the format used should be provided in each of the circuits connected to the data bus. As a result, the circuit scale is enlarged.

Figure 4:
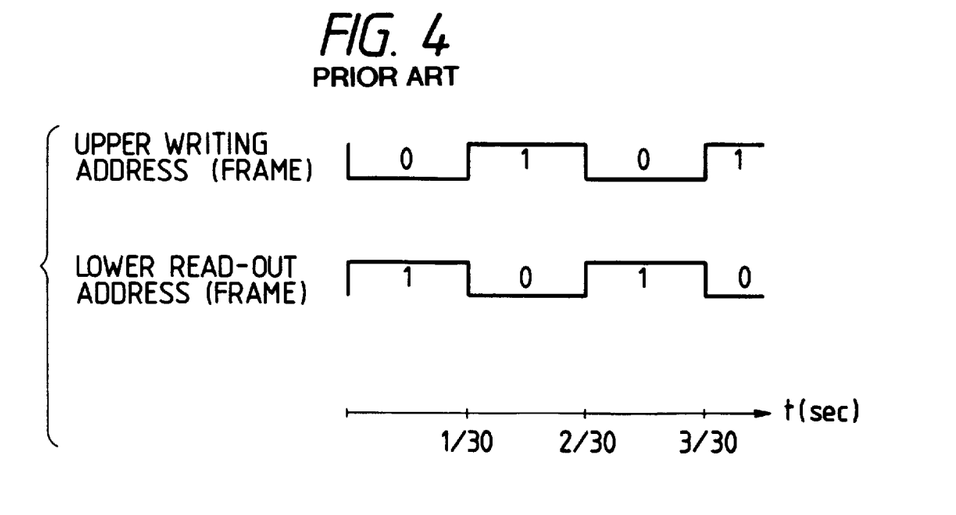
FIG. 4 illustrates memory address management in the prior art VTR.

In addition, in the VTR, a large amount of reproduced data may be lost by a special reproducing mode or a relatively large dust particle. In such a case, it is common to interpolate it by data of a preceding frame (or field). In the prior art configuration, however, an offset is provided, frame by frame (or field by field) in each of the write addresses and read addresses and it is switched by frame (or field) time so that the read address of the data memory does not pass the write address, as shown in FIG. 4.

As a result, even if the writing to the data memory is inhibited at the drop of the reproduced data, the data reversed in the data memory is not the data of the preceding frame but the data of the preceding preceding frame. Namely, the frame interpolation is conducted by the preceding frame data. In order to avoid it, a separate data memory for the frame interpolation should be provided. This will enlarge the circuit scale.

Further, for special reproduction in VTR such as slow reproduction or search, the access rate of the bus and the memory should be considerably raised. For example, in the slow reproduction made, the write addresses of the reproduced data to the data memory are discrete and overlapped, and until one frame (or field) of data is accumulated, it cannot be read out as a reproduced image. Thus, during that period, an image stored in another frame memory is repeatedly read.

The record data usually contains an error correction code by a multi-product code. In normal reproduction mode, since the integrity of the reproduced data is assured, a syndrome of an inner code and an outer code of the product code can be calculated on real time basis in parallel with the writing to the data memory. However, in the slow reproduction mode, since the integrity of the reproduced data is not assured, more data than the coded block should be temporarily stored in the memory and it should be serially read in the same order as that of the encoding to calculate the syndrome. Thus, in the slow reproduction mode, the access rate of the memory and the bus must be approximately $3/2$ time as high as that in the normal reproduction mode even when the correction is made by only the outer code.

SUMMARY OF THE INVENTION

It is an object of the present invention to solve the above problems.

It is another object of the present invention to provide an image processing apparatus which can effectively conduct the interpolation at the drop of the reproduced image without increasing the hardware scale.

In the light of the above, in accordance with one aspect of the present invention, there is provided an image processing apparatus comprising:

(a) first memory means for storing image data in a first sequence and inputting and outputting the image data from and to a first data bus;

(b) second memory means for storing image data in a second sequence different from the first sequence and inputting and outputting the image data from and to a second data bus;

(c) transfer means for exchanging the image data between said first memory means and said second memory means; and (d) control means for controlling permission or inhibition of writing of the image data transferred by said transfer means, to a transfer destination.

It is another object of the present invention to provide an image processing apparatus capable of processing image data without increasing an access speed to a memory even if the image data is discrete.

In the light of the above, in accordance with another aspect of the present invention, there is provided an image processing apparatus comprising:

(a) first memory means for storing image data in a first sequence and inputting and outputting the image data from and to a first data bus;

(b) second memory means for storing image data in a second sequence different from the first sequence and inputting and outputting the image data from and to a second data bus;

(c) transfer means for transferring the image data from said second memory means to said first memory means; and (d) control means for controlling permission or inhibition of writing of the image data transferred by said transfer means, to said second memory means.

Other objects and features of the present invention will be apparent from the following detailed description of the preferred embodiments when taken in conjunction with the accompanying drawings.

DETAILED DESCRIPTION OF THE PREFERRED EMBODIMENTS

One embodiment of the present invention is now explained with reference to the drawings.

Figure 5:
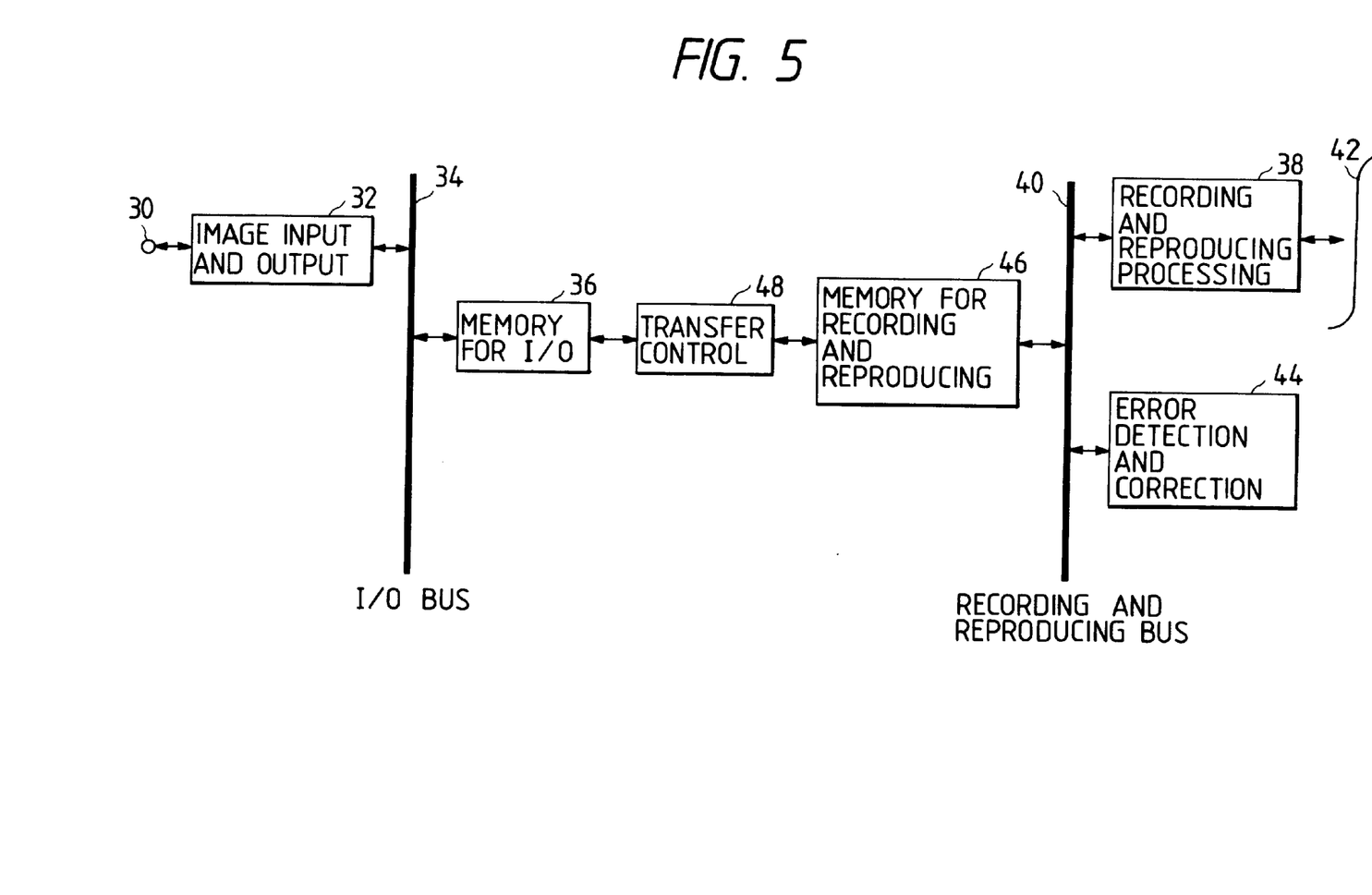
FIG. 5 shows a block diagram of a basic configuration of a digital VTR in one embodiment of the present invention.

FIG. 5 shows a block diagram of a basic configuration of the embodiment of the present invention applied to a digital VTR. Numeral 30 denotes an input/output terminal through which an analog video signal is inputted and outputted in the basic format, numeral 32 denotes an input/output circuit which converts image data on an input/output bus 34 to an analog signal to output it through the input/output terminal 30, and digitizes an image signal applied to the input/output terminal 30 to output it to the input/output bus 34, and numeral 36 denotes an input/output memory which is connected to the input/output circuit 32 through the input/output bus 34. On the input/output bus 34, the image data flows in accordance with the basic format of FIG. 1A.

Numeral 38 denotes a recording and reproducing circuit which encodes the image data inputted from a record/reproduce bus 40 in the order in accordance with the record format, into a dual product error correction code, adds a sync. code and an ID code thereto and records them on a recording medium 42, reproduces the recorded signal of the recording medium 42, decodes data in accordance with the sync. code and the ID and outputs the reproduced image data to the record/reproduce bus 40 in accordance with the record format. Numeral 44 denotes an error detection and correction circuit for detecting and correcting an error in the data reproduced by the recording and reproducing circuit 38. Numeral 46 denotes a record/reproduce memory which exchanges image data in the record format with the recording and reproducing circuit 38 and the error detection and correction circuit 44 through the record/reproduce bus 40.

Figure 6:
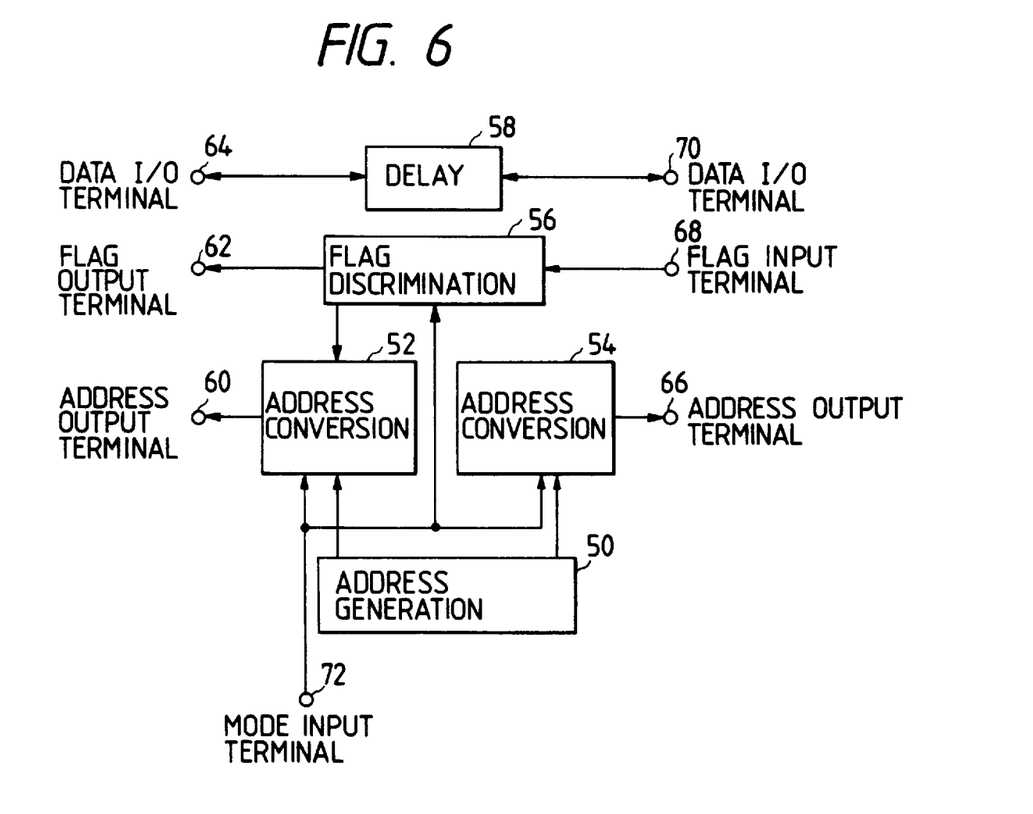
FIG. 6 shows a block diagram of a specific configuration of a data transfer control circuit of FIG. 5, FIG. 7 schematically shows a manner of data flow through a data bus in the digital VTR of FIG. 5.

The input/output memory 36 and the record/reproduce memory 46 are interconnected through the data transfer control circuit 48. A detailed circuit configuration of the data transfer control circuit 48 is shown in FIG. 6. An address generator 50 generates an address which is a base for the transfer, an address translator 52 translates the address from the address generator 50 to an address of the input/output memory 36, and an address translator 54 translates the address from the address generator 50 to an address of the record/reproduce memory 46. Through the addressing, the transfer as well as the shaffling or deshaffling are conducted.

A flag discriminator 56 determines whether frame interpolation is to be conducted or not by a modification flag to a incorrectable error of the reproduced data. A transfer data delay circuit 58 comprises a time adjusting delay element.

Numeral 60 denotes an address output terminal, numeral 62 denotes a flag output terminal and numeral 64 denotes a data input/output terminals. They are connected to the input/output memory 36. Numeral 66 denotes an address output terminal, numeral 68 denotes a flag input terminal and numeral 70 denotes a data input/output terminal. They are connected to the record/reproduce memory 36. Applied to a mode input terminal 72 is a mode signal from a system control circuit (not shown), which indicates an operation mode such as record, reproduction, slow reproduction or search. Address translation tables of the address translators 52 and 54 and the distrimination criterion of the flag discriminator 56 are selected in accordance with the mode signal.

An operation of the present embodiment is now explained.

In the record mode, the image input/output circuit 32 digitizes the image signal inputted from the input/output terminal 30 and writes it into the input/output memory 36 in the basic format shown in FIG. 1A through the input/output bus 34.

The data transfer control circuit 48 supplies the read address to the input/output memory 36 from the address translator 52 through the address output terminal 60, and supplies the write address to the record/reproduce memory 46 from the address translator 54 through the address output terminal 66. The image data read from the input/output memory 36 is transferred to the record/reproduce memory 46 through the data input/output terminal 64, the delay circuit 58 and the data input/output terminal 70. The delay circuit 58 adjusts the timing. In the transfer, data is also shaffled.

The image data written into the record/reproduce memory 46 is read in the order of the record format shown in FIG. 1B, and it is applied to the recording and reproducing circuit 38 through the record/reproduce bus 40. The recording and reproducing circuit 38 encodes it into a dual product error detection and correction code, adds a sync. code and an ID, and records them on the recording medium 42.

Figure 7:
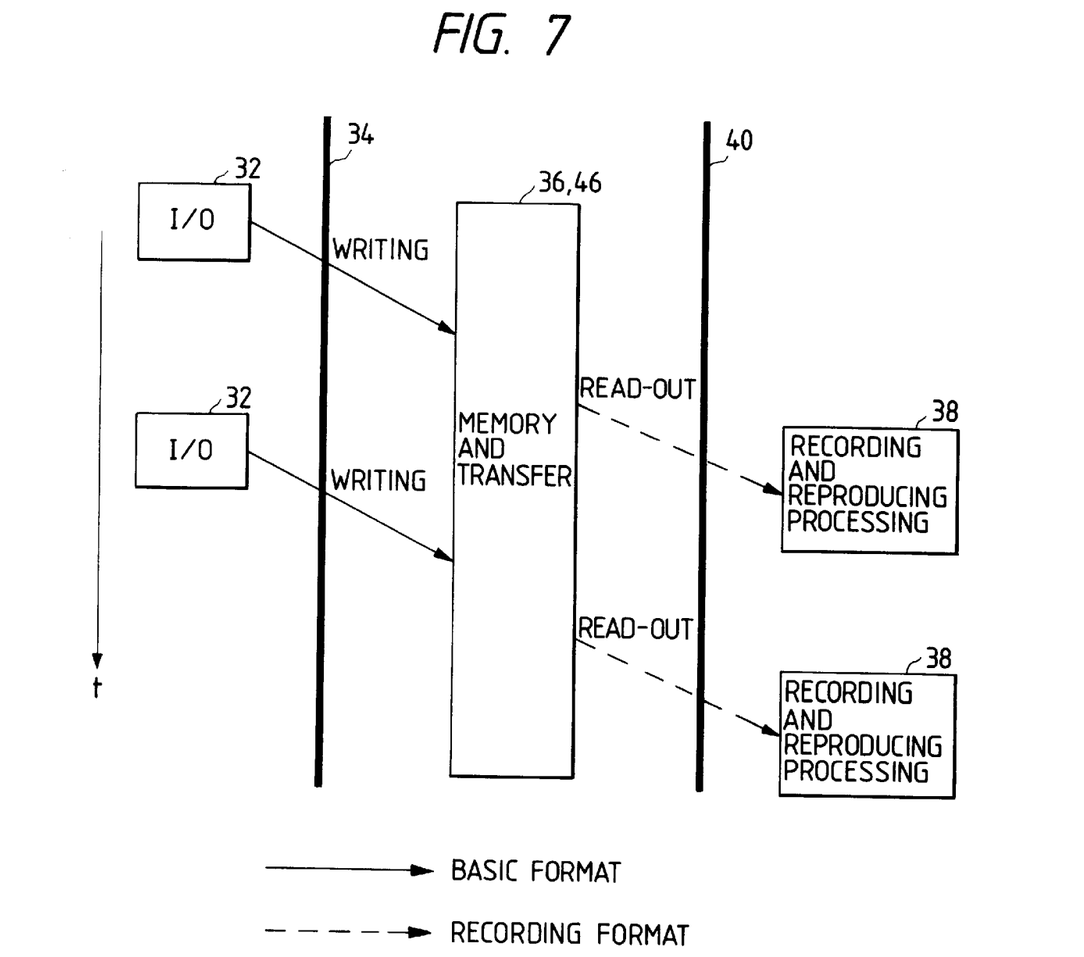

A flow of data in the record mode is shown in FIG. 7.

In the reproduction mode, the recording and reproducing circuit 38 reproduces the signal from the recording medium 42 in accordance with the sync. code and the ID, and writes the reproduced image data into the record/reproduce memory 46 through the record/reproduce bus 40. Simultaneously with the writing, the error detection and correction circuit 44 detects an error in the reproduced data and corrects a correctable error. For an incorrectable error, a modification flag is written into a flag memory area of the record/reproduce memory 46.

In the dual product code, modification flags are set in two directions for each code block indicating that an error is at the crosspoint thereof.

The record/reproduce memory 46 can parallelly read the reproduced data and the corresponding flag. The data transfer control circuit 48 reads the error-corrected and flag-set data from the record/reproduce memory 46. The reproduced data is supplied to the data input/output terminal 70 and the flag is applied to the flag input terminal 68.

In the data transfer control circuit 48, the flag discrimination circuit 56 determines whether the interframe interpolation is to be conducted or not by the flag from the flag input terminal 68. Where the interframe interpolation is to be conducted, a write inhibit signal is sent to the address translator 52, which responds to the write inhibit signal to generate an invalid area address in the input/output memory 36. In this manner, the update of the input/output memory 36 is inhibited. For example, when the flags of the two directions are set by the error detection and correction circuit 44, the error is incorrectable and the writing of data is inhibited.

The flag discrimination circuit 58 may select the interframe interpolation or the introframe interpolation. In the special reproduction mode of the VTR such as slow mode or search mode, the drop of the reproduced data frequently occurs. Accordingly, the writing to the input/output memory 36 may be inhibited by a dropout signal detected from a reproduced envelope.

The address translator 54 generates the read address to the record/reproduce memory 46 in accordance with the output of the address generator 50, and the address translator 52 generates the write address to the input/output memory 36. Through the addressing, the deshaffling and the translation from the record format to the basic format are conducted.

The image data stored in the input/output memory 36 is read into the data bus 34 in the order of the basic format, it is converted to an analog signal by the input/output circuit 32, and it is supplied to an external monitor through the input/output terminal 30.

As seen from the comparison of FIG. 3 which shows the data flow in the prior art and FIG.7 which shows the data flow in the present embodiment, the present embodiment permits to lower the access rate of the buses 34 and 40 than the access rate of the bus 22 of the prior art. Further, since the data formats of the data flowing through the buses are uniform, the memory address management is very much simplified. Further, during the transfer by the data transfer control circuit 48, the frame interpolation can be simultaneously conducted. In the present embodiment, the writing to the input/output memory 36 is inhibited by the addressing although the input/output memory 36 may be directly controlled in accordance with the result of the flag discrimination.

In the present embodiment, the digital image recording apparatus is explained although the present invention is not limited thereto but is applicable to other apparatus such as optical filing system or image data transmission system.

As described above, in accordance with the apparatus of the present embodiment shown in FIGS. 5 to 7, the access rate of the memory and the data bus can be lowered. Further, since the formats of the data transmitted through the bus are unified, the memory address management is simplified and the circuit scale is reduced. The writing to the memory of the destination can be inhibited as required so that the interframe interpolation can be essentially attained.

Figure 8:
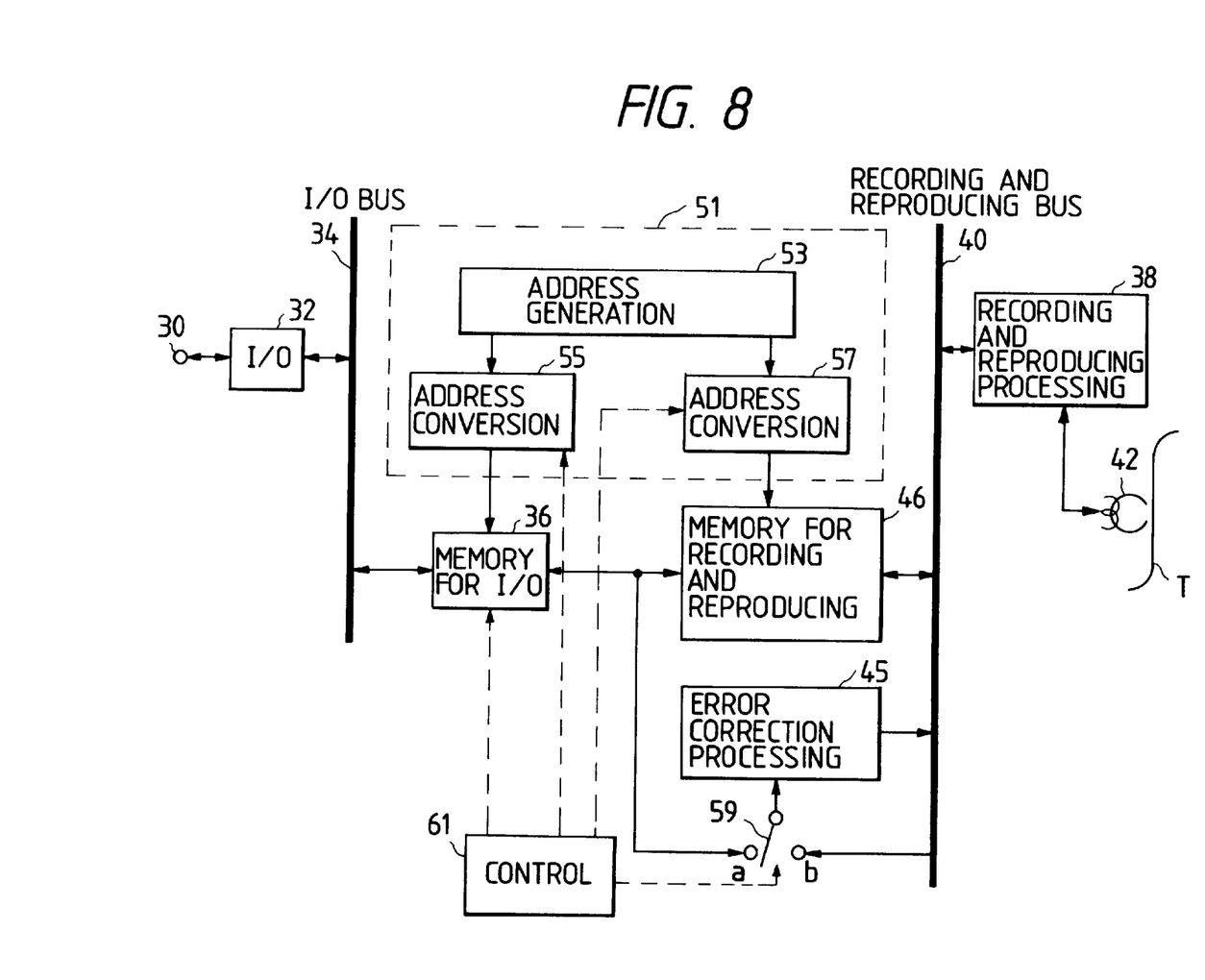
FIG. 8 shows a block diagram of a configuration of the digital VTR in another embodiment of the present invention.

FIG. 8 shows a block diagram of a configuration of another embodiment of the present invention applied to a digital VTR. Numeral 30 denotes an input/output terminal through which an analog image signal in the basic format is inputted and outputted, numeral 32 denotes an input/output circuit which converts the image data on the input/output bus 34 to an analog signal to output it to the input/output terminal 30 and digitizes the image signal applied to the input/output terminal 30 to output it to the input/output bus 34, and numeral 36 denotes an input/output memory which is connected to the input/output circuit 32 through the input/output bus 34. On the input/output bus 34, the image data flows in the basic format of FIG. 1A.

Numeral 38 denotes a recording and reproducing circuit which processes the data supplied from the record/reproduce bus 40 in the order of the record format into sync. blocks, records them on a magnetic tape T by a magnetic head 42 and reproduces the output of the magnetic head 42.

Numeral 45 denotes an error correction circuit which encodes into a dual product error correction code in the record mode and corrects an error by the error correction code in the reproduction mode. Numeral 46 denotes a record/reproduce memory which is connected in the record format with the recording and reproducing circuit 38 and the error correction circuit 45 through the record/reproduce bus 40.

The input/output memory 36 and the record/reproduce memory 46 are interconnected through the data transfer control circuit 51. The data transfer control circuit 51 comprises an address generator 53 for generating a transfer reference address, an address translator 55 for translating the address generated by the address generator 53 to an address of the input/output memory 36, and an address translator 57 for translating the address generated by the address generator 53 to an address of the record/reproduce memory 46. Through the addressing by the data transfer control circuit 51, the shaffling or the deshaffling is conducted simultaneously with the transfer.

Numeral 59 denotes a switch which, in the record mode, is connected to a contact a to supply the data transferred from the input/output memory 36 to the record/reproduce memory 46, to the error correction circuit 45, and in the reproduction mode, connected to a contact b to supply the data on the record/reproduce bus 40 to the error correction circuit 45.

Numeral 61 denotes a control circuit for controlling the overall. It supplies a mode signal indicating an operating mode such as record, reproduction, slow reproduction or search mode, to the address translators 55 and 57. A translation table of the address translators 55 and 57 is selected by the mode signal. The control circuit 61 also switches the switch 59 in accordance with the record or reproduction mode and controls the input/output memory 36.

An operation of the present embodiment is now explained.

In the record mode, the image input/output circuit 32 digitizes the image signal supplied from the input/output terminal 30 and writes it into the input/output memory 36 in the basic format shown in FIG. 1A through the input/output bus 34.

The data transfer control circuit 51 supplies the read address from the address translator 55 to the input/output memory 36 and supplies the write address from the address translator 57 to the record/reproduce memory 46. Through the addressing, the image data stored in the input/output memory 36 in the order in accordance with the basic format is shaffled and read, and it is stored in the record/reproduce memory 46 in the order in accordance with the record/reproduce format.

In the record mode, the switch 59 is connected to the contact a and the same data as that transferred from the input/output memory 36 to the record/reproduce memory 46 is also applied to the error correction circuit 45. The error correction circuit 45 calculates a parity for the error correction on real time basis by the dual product code which uses, for example, a Reed-Salomon code, and writes it into the record/reproduce memory 46 through the record/reproduce bus 40. Thus, during the data transfer from the input/output memory 36 to the record/reproduce memory 46, the data shaffling, the conversion from the basic format to the record format, and the error detection code encoding are simultaneously effected.

The image data (including the error correction parity) written into the record/reproduce memory 46 is read in the order of the record format shown in FIG. 1B, and it is supplied to the recording and reproducing circuit 38 through the record/reproduce bus 40. The recording and reproducing circuit 38 adds a sync. code and an ID to form predetermined sync. blocks, and records them on a magnetic tape T by the magnetic head 42.

A flow of data in the record mode is shown in FIG. 7.

In the normal reproduction mode, the recorded signal on the magnetic tape T is converted to an electrical signal by the magnetic head 42, and the recording and reproducing circuit 38 reproduces the output of the magnetic head 42 in accordance with the sync. code and the ID of the sync. block, and writes the reproduced data including the parity into the record/reproduce memory 46 through the record/reproduce bus 40.

In the reproduction mode, the control circuit 61 switches the switch 59 to the contact b so that the reproduced data outputted from the recording and reproducing circuit 38 to the record/reproduce bus 40 is also applied to the error correction circuit 45. The error correction circuit 45 calculates a syndrome for the error correction on a real time basis, supplies the correction address and the error pattern based on the calculation result to the record/reproduce memory 46 through the record/reproduce bus 40 to conduct the correction of the error in the code. For an error which is beyond the ability of correction, a modification flag is set in a flag area of the record/reproduction memory 46.

When the correction of the code error and the setting of the flag have been completed, the data transfer control circuit 51 transfers data from the record/reproduce memory 46 to the input/output memory 36 through the addressing by the address generator 53 and the address translators 55 and 57. In the transfer, the conversion from the record format to the basic format and the shaffling of data are conducted.

The input/output circuit 32 accesses the input/output memory 36 through the input/output bus 34, decodes the image, interpolates the data designated by the modification flag, converts it to an analog signal in the order of the basic format, and outputs it to an external monitor through the input/output terminal 30.

Figures 9A, 9B:
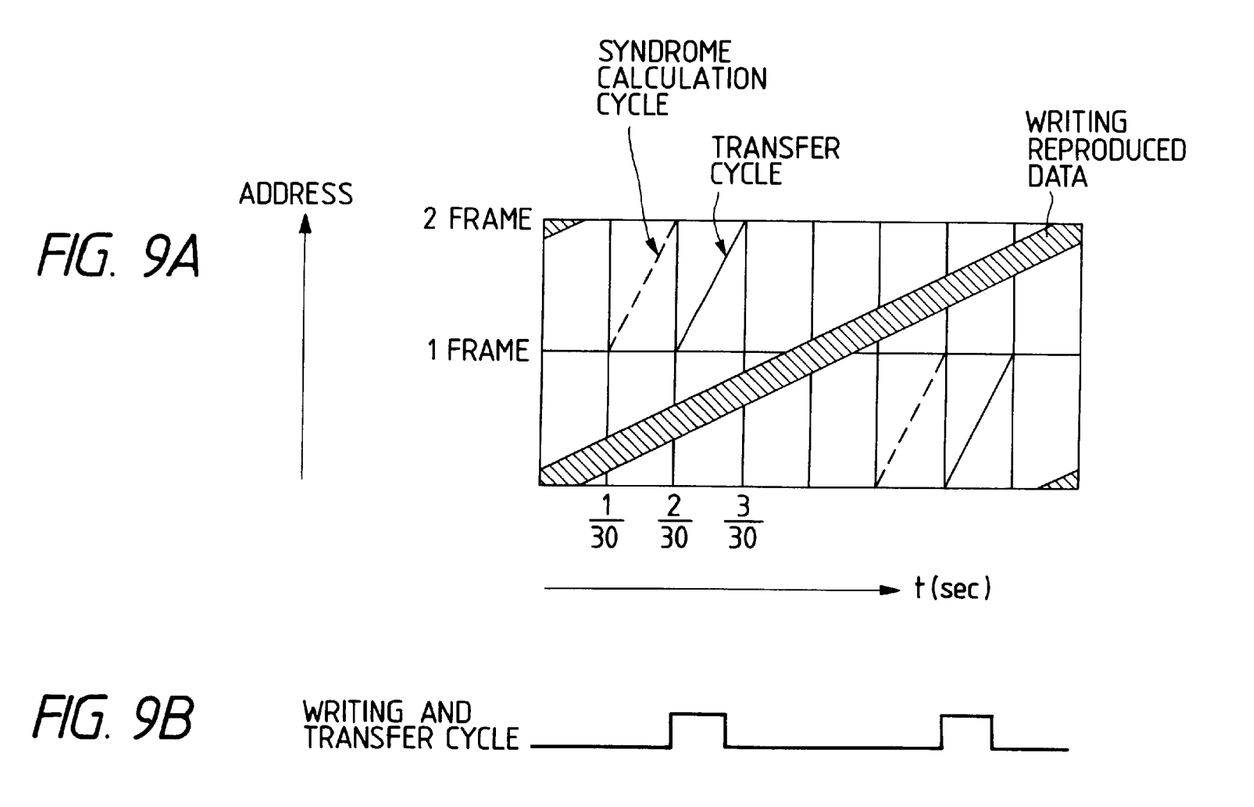
FIGS. 9A to 9C illustrate address management of a recording/reproducing memory of the digital VTR of FIG. 8.
Figure 9C:
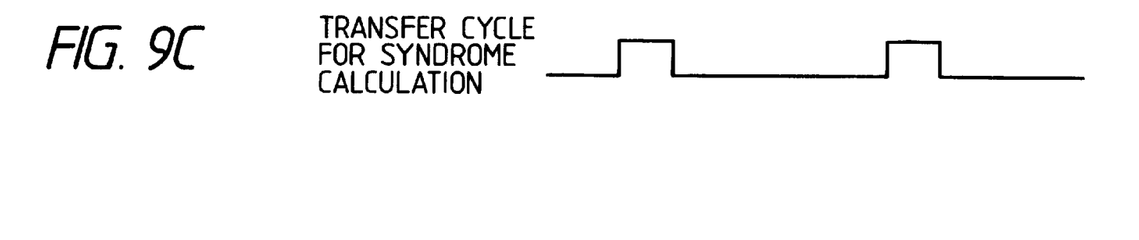

An operation in the slow reproduction mode is now explained. FIGS. 9A to 9C show timing charts for a ¼ speed slow reproduction mode. Like in the normal reproduction mode, the recording and reproducing circuit 38 writes the reproduced data into the record/reproduce memory 46 in accordance with the ID of the sync. block. The write addresses are discrete and may overlap. FIG. 9A shows a relationship between the write address and the time. An ordinate represents the address and the abscissa represents the time. A hatched area shows an area in which an address to write the reproduced data into the record/reproduce memory 46 by the recording and reproducing circuit 38 may be generated. Within this area, the addressing is done discretely and the data may be written into the same address. Thus, a time which is four times as long as the time required in the normal reproduction mode is required to write one frame of data. The record/reproduce memory 46 has two-frame memory capacity, and the entire one-frame data is stored when the writing of the next frame is started.

In the slow reproduction mode, the control circuit 61 connects the switch 59 to the contact a. The control circuit 61 inhibits the writing (or updating) of the input/output memory 36 when one frame of data of the record/reproduce memory 46 has been stored, and the data transfer control circuit 51 reads the data from the record/reproduce memory 46. The read data is supplied to the error correction circuit 45 through the switch 59. The error correction circuit 45 calculates a syndrome by using the data from the switch 59 as it does in the normal reproduction mode, accesses the record/reproduce memory 46 through the record/reproduce bus 40 to correct the code error and set the modification flag.

When one frame of correction has been completed, the control circuit 61 releases the inhibit of the writing of the input/output memory 36, and the data transfer control circuit 51 reads one frame of error-corrected data of the record/reproduce memory 46 at the timing shown in FIG. 9B as it does in the normal reproduction mode, and writes it into the input/output memory 36.

The correction of the error and the transfer to the input/output memory 36 are periodically conducted as shown in FIGS. 9B and 9C so that the corrected image data is written into the input/output memory 36. Like in the normal reproduction mode, the input/output circuit 32 accesses the input/output memory 36, converts the image data read in the order of the basic format to an analog signal and outputs it to the input/output terminal 30.

As seen from the comparison of FIG. 7 which shows the data flow in the present embodiment and FIG. 3 which shows the data flow in the prior art, the present embodiment allows to lower the access rate of the buses 34 and 40 than the access rate of the bus 22 in the prior art. Further, since the formats of the data flowing through the buses are uniform, the memory address management is simplified. Further, since the bidirectional input to the error correction circuit 45 by the switch 59 is attained, the perfect error correction is mode without need to reduce the processing speed even in the special mode, particularly in the slow reproduction mode. While the ¼ speed slow reproduction mode has been specifically explained, a similar effect may be attained at any speed of slow reproduction mode such as ½ speed slow reproduction mode.

In the present embodiment, the digital image recording apparatus has been explained although the present invention is not limited thereto and it may be applied to other apparatus such as an optical filing system or an image data transfer system.

As described above, in accordance with the apparatus of the embodiment shown in FIGS. 8 and 9, the access rate of the memory and the data bus can be lowered. Further, since the formats of the data transmitted through the bus is unified, the memory address management is simplified and the circuit scale is reduced. When the required data is available only discretely in the special reproduction mode of the VTR, the error correction can be perfectly attained without increasing the memory capacity or reducing the processing speed so that a high quality of image can be attained.

What is claimed is:

1. An image processing apparatus, comprising:
   a first data bus for transferring image data having a first sequence;
   input means, connected to said first data bus, for inputting the image data having the first sequence onto the first data bus;
   first memory means, connected to said first data bus, for storing the image data having the first sequence, said first memory means inputting the image data having the first sequence from said input means through said first data bus;
   a second data bus for transferring image data having a second sequence different from the first sequence, wherein image data having the second sequence is never transferred by said first data bus;
   second memory means, connected to said second data bus, for storing the image data having the second sequence, said second memory means inputting the image data having the second sequence through said second data bus and outputting the image data having the second sequence through said second data bus;
   recording and reproducing means, connected to said second data bus, for recording on and reproducing from a recording medium the image data having the second sequence,
   wherein said recording and reproducing means inputs the image data having the second sequence from said second memory means through said second data bus and outputs the reproduced image data to said second memory means through said second data bus; and
   transfer means for transferring image data between said first memory means and said second memory means in a transfer process that changes a sequence of the transferred image data, said transfer means interpolating error data of the reproduced image data as part of the transfer process while transferring the reproduced image data from said second memory means to said first memory means.

2. An image processing apparatus according to claim 1, wherein said first sequence is a sequence in accordance with an arrangement of image data on a screen, and said second sequence is a sequence not related to the arrangement of image data on the screen.

3. An image processing apparatus according to claim 2, wherein said recording and reproducing means records and reproduces the image data on said second data bus to and from the recording medium.

4. An image processing apparatus according to claim 2, further comprising:
   error detection/correction encoding/decoding means for error detection/correction encoding/decoding the data on said second data bus,
   wherein said interpolation means controls the permission or inhibition of writing of the image data transferred by said transferring means to said first memory means in accordance with the error detection/correction decoding by said error correction/detection encoding/decoding means.

5. An image processing apparatus according to claim 1, wherein said transfer means includes address translation means for translating a memory address of the image data in said first memory means and a memory address of the image data in said second memory means.

6. An image processing apparatus, comprising:
   a first data bus for transferring image data having a first sequence;
   a second data bus for transferring image data having a second sequence different from the first sequence, wherein image data having the second sequence is never transferred by said first data bus;
   receiving means, connected to said second data bus, for receiving image data having the second sequence reproduced from a recording medium and outputting the reproduced image data to said second data bus; and
   transfer means for transferring image data between said first data bus and said second data bus in a transfer process that changes a sequence of image data transferred between said first data bus and said second data bus,
   said transfer means interpolating the reproduced image data by substituting error data of the reproduced image data to be transferred from said second data bus to said first data bus with other image data as part of the transfer process.

7. A device according to claim 6, wherein said first sequence is a sequence in accordance with an arrangement of image data on a screen, and said second sequence is a sequence not related to the arrangement of image data on the screen.

8. A device according to claim 6, further comprising output means, connected to said second data bus, for outputting the image data on said second data bus to recording means for recording the image data on the recording medium.

9. A device according to claim 6, further comprising error correction means for correcting code errors in the reproduced image data on said second data bus,
   wherein said transfer means interpolates code errors which cannot be corrected by said error correction means by substituting the uncorrectable code errors in the reproduced image data with other image data.

10. A device according to claim 6, wherein first memory means for storing the image data having the first sequence is connected to said first data bus and second memory means for storing the image data having the second sequence is connected to said second data bus.

11. An image processing apparatus, comprising:

a first data bus for transferring image data having a first sequence;

a second data bus for transferring image data having a second sequence different from the first sequence, wherein image data having the second sequence is never transferred by said first data bus;

reproducing means, connected to said second data bus, for reproducing image data having the second sequence and error correction codes for correcting code errors in the reproduced image data and outputting the reproduced image data and the error correction codes to said second data bus; and transfer means for transferring image data between said first data bus and said second data bus in a transfer process that changes a sequence of image data transferred between said first data bus and said second data bus, said transfer means including error correction means for correcting code errors in the reproduced image data output to said second data bus by said reproducing means and interpolating code errors that cannot be corrected by said error correction means as part of the transfer process while said transfer means is transferring the reproduced image data from said second data bus to said first data bus.

12. An image processing apparatus according to claim 11, wherein said first sequence is a sequence in accordance with an arrangement of image data on a screen, and said second sequence is a sequence not related to the arrangement of image data on the screen.

13. An image processing apparatus according to claim 12, further comprising:

recording means for recording the image data on the second data bus to the recording medium.

* * * * *

UNITED STATES PATENT AND TRADEMARK OFFICE
CERTIFICATE OF CORRECTION

PATENT NO. : 5,930,453
DATED : July 27, 199199
INVENTOR(S) : TETSUYA SHIMIZU ET AL.

It is certified that error appears in the above-identified patent and that said Letters Patent is hereby corrected as shown below:

COLUMN 1

Line 34, "FIG. 1A," should read --FIG. 1A--.

COLUMN 2

Line 37, "made," should read --mode,--.
    Line 55, "time" should read --times--.

COLUMN 4

Line 42, "a" should read --an--.
    Line 46, "terminals." should read --terminal.--.

COLUMN 8

Line 3, "record/reproduction" should read
        --record/reproduce--.

COLUMN 9

Line 6, "mode" should read --made--.

UNITED STATES PATENT AND TRADEMARK OFFICE
CERTIFICATE OF CORRECTION

PATENT NO.   :  5,930,453
DATED        :  July 27, 199199
INVENTOR(S)  :  TETSUYA SHIMIZU ET AL.

Page 2 of 2

It is certified that error appears in the above-identified patent and that said Letters Patent is hereby corrected as shown below:

COLUMN 10

Line 26, "apparatus," should read --device,--.

Signed and Sealed this

Third Day of April, 2001

Attest:

NICHOLAS P. GODICI

Attesting Officer

Acting Director of the United States Patent and Trademark Office